United States Patent
Goodman et al.

(10) Patent No.: US 7,092,990 B2
(45) Date of Patent: *Aug. 15, 2006

(54) HANDLING NODE ADDRESS FAILURE IN A DISTRIBUTED NODAL SYSTEM OF PROCESSORS

(75) Inventors: Brian Gerard Goodman, Tucson, AZ (US); Ronald Faye Hill, Jr., Tucson, AZ (US); Leonard George Jesionowski, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 702 days.

This patent is subject to a terminal disclaimer.

(21) Appl. No.: 10/179,186

(22) Filed: Jun. 26, 2002

(65) Prior Publication Data

US 2004/0010568 A1 Jan. 15, 2004

(51) Int. Cl.
G06F 15/16 (2006.01)
(52) U.S. Cl. .................... 709/203; 709/224; 717/112; 717/172
(58) Field of Classification Search ................ 709/203, 709/221–224; 717/111–112, 171, 172, 173, 717/174
See application file for complete search history.

(56) References Cited

U.S. PATENT DOCUMENTS

| 5,386,515 | A | | 1/1995 | Martin et al. ................ 395/275 |
| 5,463,763 | A | * | 10/1995 | Kubo ............................ 714/4 |
| 5,509,136 | A | | 4/1996 | Korekata et al. ........... 395/478 |
| 5,539,725 | A | | 7/1996 | Trubey et al. ................ 370/13 |
| 5,675,736 | A | * | 10/1997 | Brady et al. ................ 709/239 |
| 5,812,767 | A | | 9/1998 | Desai et al. ............. 395/200.8 |
| 5,832,304 | A | | 11/1998 | Bauman et al. ............. 395/860 |
| 5,931,916 | A | * | 8/1999 | Barker et al. ............... 709/239 |
| 5,987,506 | A | | 11/1999 | Carter et al. ................ 709/213 |
| 6,032,213 | A | * | 2/2000 | Gulick ........................ 710/312 |
| 6,038,639 | A | | 3/2000 | O'Brien et al. ............. 711/114 |
| 6,101,499 | A | | 8/2000 | Ford et al. .................... 707/10 |
| 6,185,638 | B1 | | 2/2001 | Beardsley et al. ............ 710/36 |
| 6,350,803 | B1 | * | 2/2002 | Huang et al. ................ 524/440 |
| 6,513,094 | B1 | * | 1/2003 | Magro ........................ 711/103 |
| 6,519,678 | B1 | * | 2/2003 | Basham et al. ............. 711/112 |
| 6,542,962 | B1 | * | 4/2003 | Kodama et al. ............. 711/114 |
| 6,553,002 | B1 | * | 4/2003 | Bremer et al. .............. 370/254 |

(Continued)

FOREIGN PATENT DOCUMENTS

WO 99/50848 10/1999

OTHER PUBLICATIONS

"Duplicate Internet Protocol Address Detection Based on Gratuitous Address Resolution Protocol", IBM Technical Disclosure Bulletin, vol. 41, No. 01, Jan. 1998, pp. 703-705.

*Primary Examiner*—Khanh Dinh
*Assistant Examiner*—Van Kim T. Nguyen
(74) *Attorney, Agent, or Firm*—John H. Holcombe (57) ABSTRACT

Addressing failure is handled in a nodal system of processor nodes, which comprise at least one processor and at least one interface to a network. Upon detection of a node address failure of a processor node for the network, such as lack of a node address, or presence of a duplicate address, the processor node is disabled from the network, thereby temporarily failing the processor node so that the system remains operational. An alternate node address stored in nonvolatile memory may be selected that avoids the node address failure.

19 Claims, 4 Drawing Sheets

U.S. PATENT DOCUMENTS 6,718,228 B1 * 4/2004 Campbell et al. ........... 700/214
6,779,077 B1 * 8/2004 Bakke et al. ............... 711/111
6,782,448 B1 * 8/2004 Goodman et al. .......... 711/112
6,920,485 B1 * 7/2005 Russell ....................... 709/214

* cited by examiner

HANDLING NODE ADDRESS FAILURE IN A DISTRIBUTED NODAL SYSTEM OF PROCESSORS

FIELD OF THE INVENTION

This invention relates to distributed nodal systems of processors, and, more particularly, to node addressing in a network of a nodal system of processors. One example of a distributed nodal system of processors constitutes processors for operating an automated data storage library.

BACKGROUND OF THE INVENTION

Distributed nodal systems of processors, also called "embedded" processor systems, are being employed in a wide variety of applications, and in ever increasing numbers. In distributed nodal systems of processors, for example, in a control system, overall system control is distributed among two or more processor nodes in the system or product.

An advantage of such systems is that problem diagnosis and repair is simplified because functions are isolated to different areas of the system. Further, such systems can be expanded by adding components and processor nodes, without replacing the entire system. The nodes of a distributed control system are usually interconnected with one or more communication networks, herein called a "network".

One example of a control system comprising a distributed nodal system of processors comprises an automated data storage library, such as an IBM 3584 Ultra Scalable Tape Library. The processors of the 3584 library are embedded with various components of the library, communicate over a bus network, and operate the components and, thereby, the library. A discussion of an automated data storage library with a distributed nodal system of processors is provided in U.S. Pat. No. 6,356,803, issued Mar. 12, 2002. Repair actions for such systems may comprise replacing an individual component, a processor node, or a processor at the node. The library is formed of one or more "frames", each comprising a set or subset of library components, such as storage shelves for storing data storage media; one or more data storage drives for reading and/or writing data with respect to the data storage media; a robot accessor for transporting the data storage media between the storage shelves and data storage drives; a network; and a plurality of processor nodes for operating the library. The library may be expanded by adding one or more frames and/or one or more accessors or other nodes.

Another example of a control system comprising a distributed nodal system of processors comprises an automobile multi-processor network.

In order to communicate over the network, the components and/or the processor nodes, must have node addresses, such as employed with CAN busses or Ethernet networks, as are known to those of skill in the art. When a frame is added, the processor node(s) added to the network may have no node address, or have a partial node address, and node addresses must be given to the new processor nodes. When an individual component, processor node, or a processor at the node, is replaced, either with a new component, etc., or another component, etc., is swapped, the processor node may have no node address, or, if swapped, may employ its previous node address. Further, processor node cards may be interchangeable for all of the components, allowing ease of parts handling and to simplify diagnosis and repair, but preventing the use of static addressing where there is a separate part number for each node address, or preventing the node address from being permanently fixed at each processor node card.

One way of providing a new node address is for an operator or repair person to assign a node address. In one example of a complex node address, a component may have a function portion of an address coded into a card, and a frame number is supplied to the processor node, and the function address and frame number are combined to calculate a node address. Alternatively, automatic modes of providing new node addresses may be employed. As one example, a cable is designed with certain lines tied high or low to provide a binary number that may be employed to calculate the node address. As another example, as discussed in U.S. patent application Ser. No. 09/854,865, filed May 14, 2001, a pulse generator and delay signal generator may provide an automatic frame count, which may be used with the function address to calculate the node address. As another example, a server may employ a dynamic host configuration protocol (DHCP) to give a processor node an IP address.

In either a manual or an automated mode, failure is a possibility. For example, the operator may misjudge the placement or function of the processor node. In an automatic mode, the binary cable might become defective, misplugged, or the wrong cable might be used. As another example, the frame counter circuit might become defective, or the cabling could become misplugged.

In such a case, the component may have no node address when on the network, may have a wrong address, or may present an address that is a duplicate of another component on the network. A duplicate address is possible when one processor node is at a component which performs a duplicate function as another component, and misreads the frame number, and employs the erroneous frame number in the address. Alternatively, the processor node may be swapped from one system to another, and be at a different location in the new system. Addressing errors, such as the presence of an unknown component or duplicate on the network, can render all or part of the system inoperable, and require maintenance actions.

Failures of products are becoming less tolerable as systems and customer expectations move toward a concept of continuous availability, such as the well known "24×7×365" availability.

As an example, automated data storage libraries provide a means for storing large quantities of data on data storage media that are not permanently mounted on data storage drives, and that are stored in a readily available form on storage shelves. One or more robot accessors retrieve selected data storage media from storage shelves and provide them to data storage drives. Typically, data stored on data storage media of an automated data storage library, once requested, is needed quickly. Thus, it is desirable that an automated data storage library be maintained in an operational condition on a continuous basis as much as possible.

Automated data storage libraries may comprise systems which are operated by a plurality of processors working together, such as a central controller which interfaces with the host systems through an external interface, and provides a constantly updated inventory of the locations and content of the data storage media within the library, and a robot control system which identifies precise locations of the data storage drives and the storage shelves, and calculates the best operation of the robot accessor(s) to efficiently transport data storage media between the various storage shelves and data storage drives. Many of the components are redundant, allowing a processor node to fail, and still have the overall system operate, but all are dependent upon a proper network addressing structure to perform together.

Global addressing is known, for example, as shown by U.S. Pat. No. 5,987,506 for allocating addresses across multiple "clouds" by carefully segmenting the addresses, and does not allow the same address to be allocated in more than one cloud, but provides no method of handling addressing failures.

There are many examples of conflicts in addressing. For example, U.S. Pat. No. 5,386,515, resolves a conflict by shifting an address space of a hardware adapter to a next sequential address space, ignoring the conflicting address space. However, the system is down and not operational until the conflict is resolved. IBM Technical Disclosure Bulleting Vol. 41, No. 01, January, 1998, pp. 703–705, forces a reply by a host in response to duplication of both sender and receiver IP addresses, so that the duplicate host turns off its interface, and posts a warning message. The replying host may keep using the IP addresses until it is corrected manually, reducing the disruption to the replying host. When a node logs on, all hosts on the network will receive the duplicate IP addresses, and all may thus go through the reply process. Only after the duplicate host receives the reply and turns off its interface, can the replying hosts communicate with the original IP address owner.

SUMMARY OF THE INVENTION

In accordance with the present invention, a distributed nodal system of processors, such as of an automated data storage library, a processor node of the system, a method, and computer readable program code, handle addressing failure for the nodal system.

In one embodiment, a distributed nodal system of processors in a network are provided, wherein the processor nodes comprise at least one processor and at least one interface to the network. At least one of the processor nodes, upon detection of a node address failure of the processor node for the network, such as lack of a node address, a nominal address that is a wrong address, or comprises a duplicate address, for example, detected at the processor node interface, disables the processor node from the network. By disabling the processor node or its nominal address from the network, only the processor node and its component are temporarily failed, and the system thus remains operational. The node address is for addressing the processor node in the network upon enabling the processor node in the network.

In another embodiment, the processor node additionally comprises a nonvolatile memory, and maintains an alternate node address of the processor node in the nonvolatile memory. As an example, the alternate node address may comprise the node address of the last successful detection of node addressing. The processor node, upon detecting a node address failure, for example, by detecting a conflict, or as another example, by attempting to determine its own node address externally, and failing to determine any usable node address as its own, selects a node address that avoids the node address failure, by selecting the alternate node address in the nonvolatile memory.

In a further-embodiment, a processor node initially determines a nominal node address as its own, senses node addresses of other processor nodes of the network, and compares the sensed node addresses of other processor nodes with the nominal node address. If the processor node determines the existence of any conflict between at least one of the sensed node addresses of other processor nodes with the nominal node address, the existing conflict comprises a node address failure of the processor node for the network, and the processor node is disabled from the network.

In a still further embodiment, at least two of the processor nodes of the network are subject to reset, and comprise at least one processor, at least one interface to the network, and a timer, the timer maintaining an indication of time since the processor node has been reset. As above, a node address failure is determined upon the existence of any conflict between at least one of the sensed node addresses of other processor nodes with the nominal node address of a processor node.

A processor node having the conflicting node address, compares the timers, to determine if it has the more recent time since a reset. If the processor node has the more recent time, then its nominal address is disabled from the network.

In another embodiment, a wrong node address may be determined by the processor node maintaining designating information of element(s) associated with the node. In one example, data storage drives coupled to a processor node have unique serial numbers, and the processor node stores the serial numbers as designating information. When the node determines a nominal node address, it senses the present designating information of associated elements, and compares the present designating information to the maintained designating information. A determination of a failure of a match is a node address failure of the processor node, resulting in disabling the processor node nominal address from the network.

By disabling a processor node having an address failure from the network, only the component is temporarily failed, and the system remains operational. Employing an alternate node address which avoids the address failure, further prevents any disruption to the system, and avoids any immediate repair action for the processor node or component.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
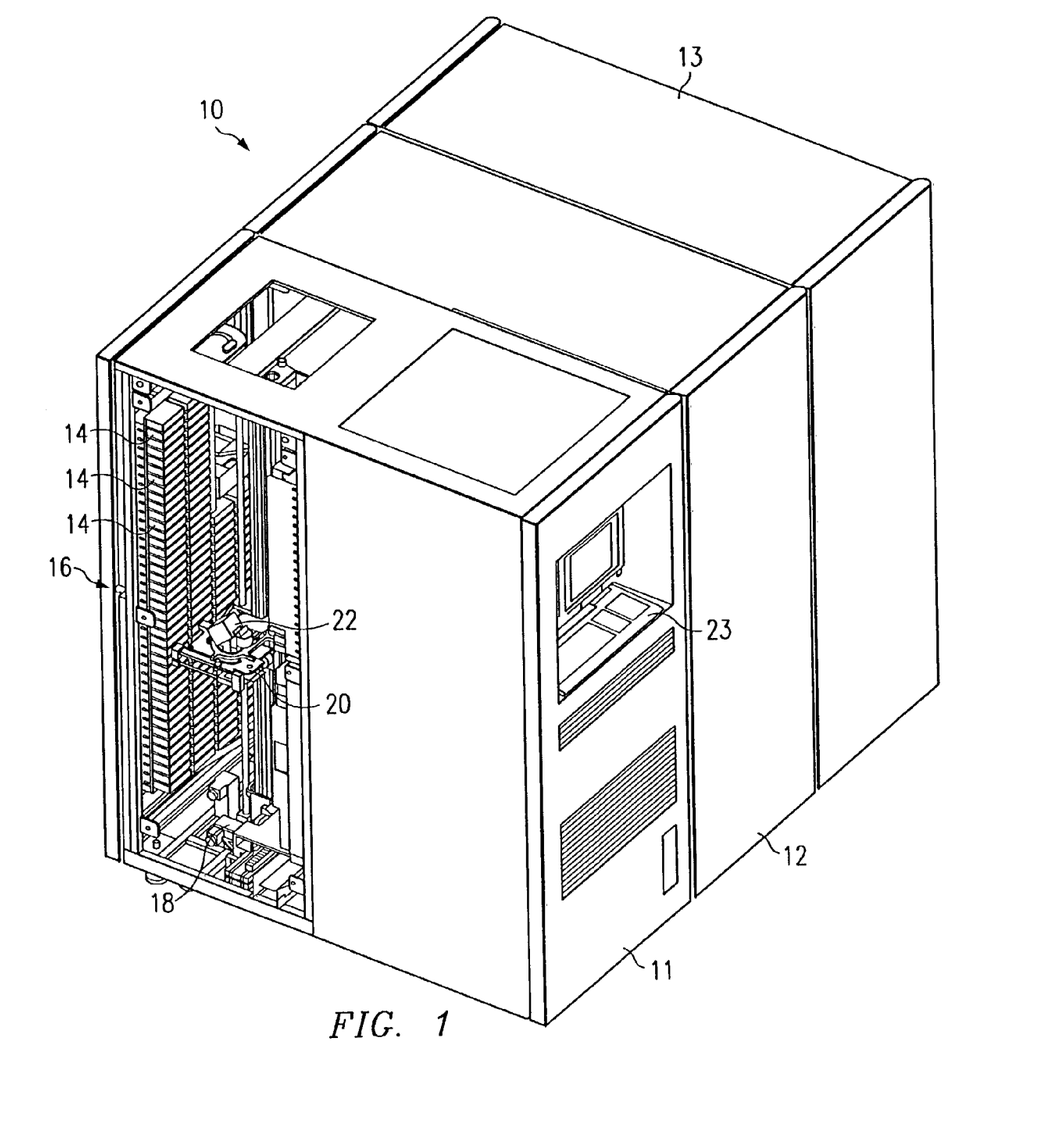
FIG. 1 is an isometric view of an automated data storage library which may implement a plurality of processor nodes in accordance with the present invention.

FIG. 1 illustrates an embodiment of an automated data storage library 10, which may implement a plurality of processor nodes in accordance with the present invention. The library is arranged for accessing data storage media 14 in response to commands from at least one external host system, and comprises a plurality of storage shelves 16 for storing data storage media; at least one data storage drive for reading and/or writing data with respect to the data storage media; and at least one robot accessor 18 for transporting the data storage media between the plurality of storage shelves 16 and the data storage drive(s). The library may also comprise an operator panel 23 or other user interface, such as a web-based interface, which allows a user to interact with the library. The library 10 may comprise one or more frames 11–13, each having storage shelves 16 accessible by the robot accessor 18. The robot accessor 18 comprises a gripper assembly 20 for gripping one or more data storage media 14, and may include a bar code scanner 22 or reading system, such as a smart card reader or similar system, mounted on the gripper 20, to "read" identifying information about the data storage media 14.

Figure 2:
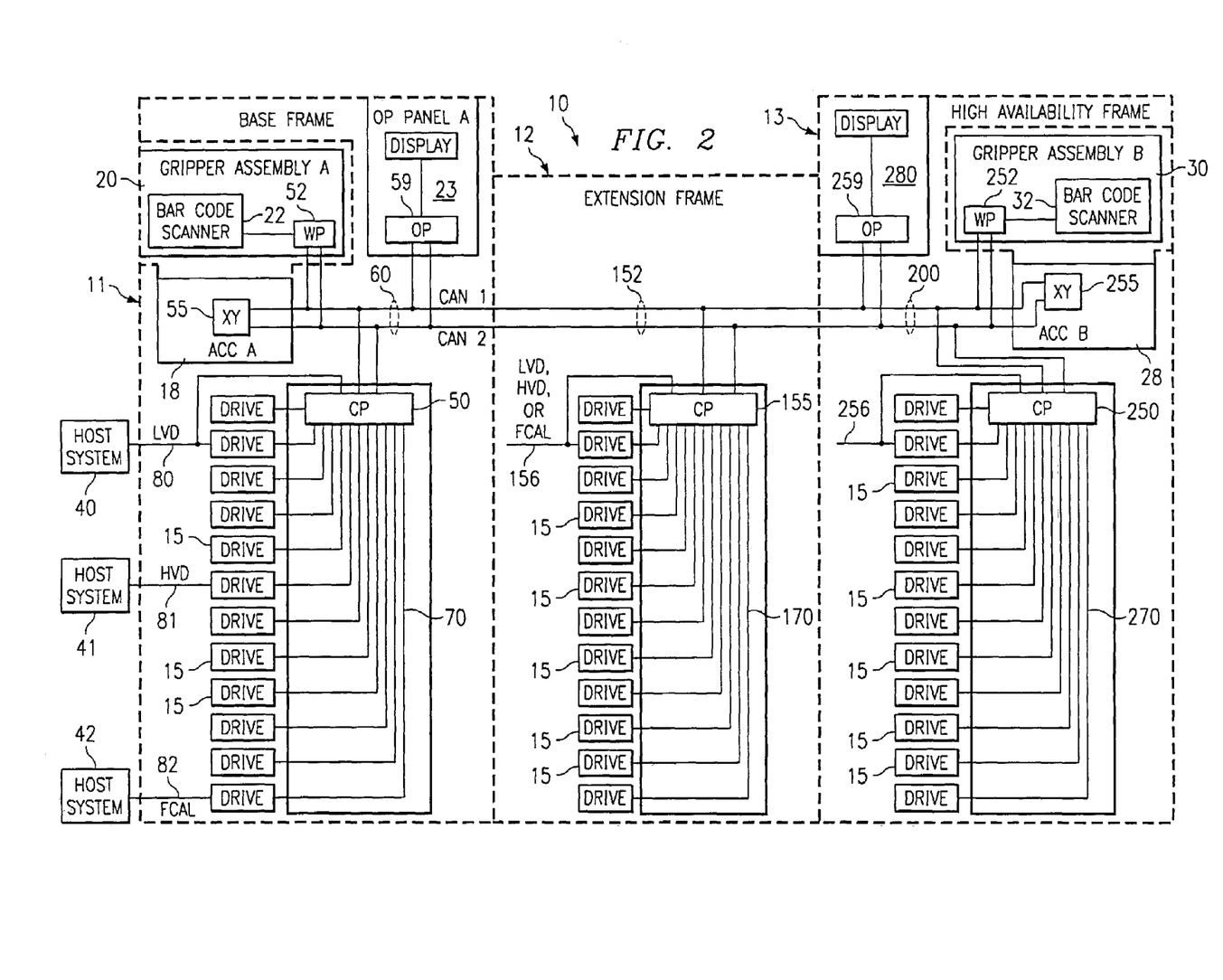
FIG. 2 is a block diagrammatic representation of an embodiment of the automated data storage library of FIG. 1, employing the plurality of processsor nodes in accordance with the present invention.

FIG. 2 illustrates an embodiment of a data storage library 10 of FIG. 1, which employs a plurality of processor nodes in accordance with the present invention. An example of a data storage library which may implement the present invention is the IBM 3584 Ultra Scalable Tape Library. The library comprises a base frame 11, may additionally comprise one or more extension frames 12, and may comprise a high availability frame 13.

The base frame 11 of the library 10 comprises one or more data storage drives 15, and a robot accessor 18. As discussed above, the robot accessor 18 comprises a gripper assembly 20 and may include a reading system 22 to "read" identifying information about the data storage media 14. The data storage drives 15, for example, may be optical disk drives or magnetic tape drives, and the data storage media 14 may comprise optical or magnetic tape media, respectively, or any other removable media and associated drives. As examples, a data storage drive may comprise an IBM LTO Ultrium Drive, may comprise a DLT 8000 Drive, etc. Additionally, a control port may be provided, which acts to communicate between a host and the library, e.g., receiving commands from a host and forwarding the commands to the library, but which is not a data storage drive.

The extension frame 12 comprises additional storage shelves, and may comprise additional data storage drives 15. The high availability frame 13 may also comprise additional storage shelves and data storage drives 15, and comprises a second robot accessor 28, which includes a gripper assembly 30 and may include a bar code scanner 32 or other reading device, and an operator panel 280 or other user interface. In the event of a failure or other unavailability of the robot accessor 18, or its gripper 20, etc., the second robot accessor 28 may take over.

In the exemplary library, each of the robot accessors 18, 28 moves its gripper in at least two directions, called the horizontal "X" direction and vertical "Y" direction, to retrieve and grip, or to deliver and release the data storage media 14 at the storage shelves 16 and to load and unload the data storage media at the data storage drives 15.

Figure 3:
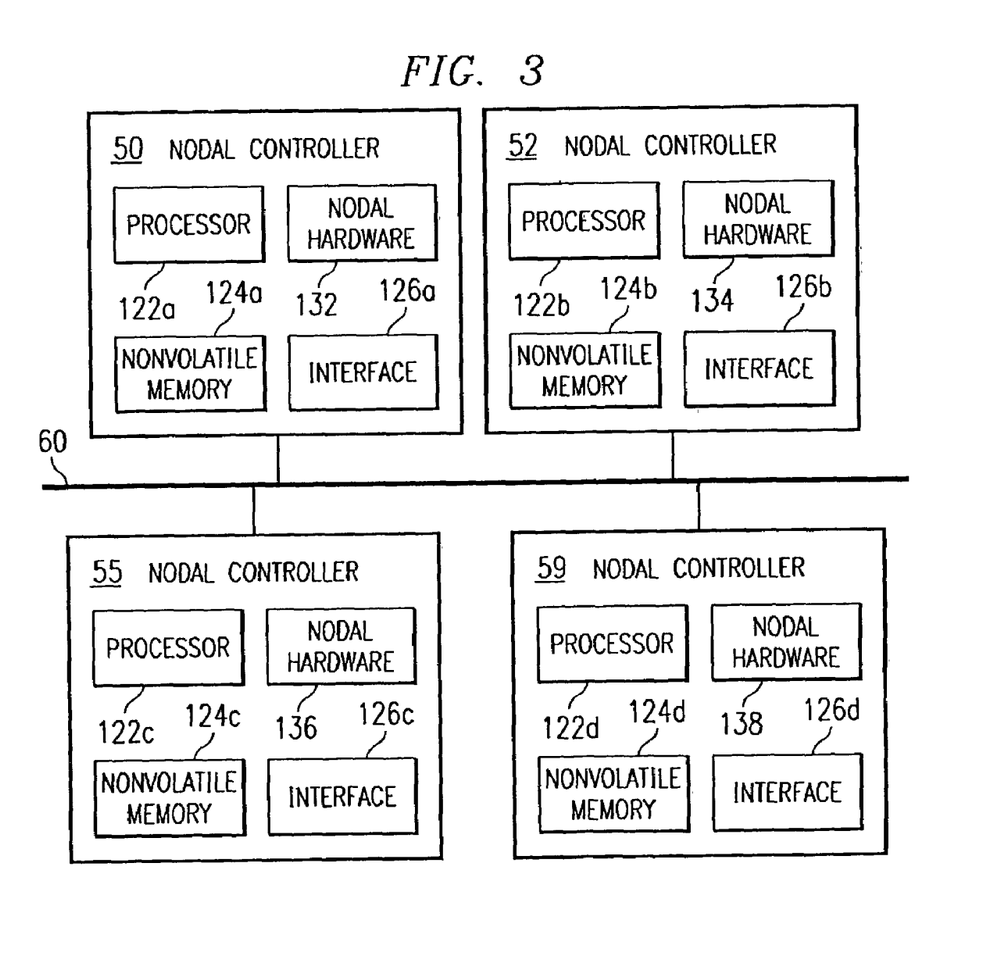
FIG. 3 is a block diagrammatic representation of a plurality of processor nodes of FIG. 2.

Referring to FIGS. 2 and 3, the library 10 receives commands from one or more host systems 40, 41 or 42. The host systems, such as host servers, communicate with the library directly, e.g., on path 80, through one or more control ports (not shown), or through one or more data storage drives 15, providing commands to access particular data storage media and move the media, for example, between the storage shelves and the data storage drives. The commands-are typically logical commands identifying the media and/or logical locations for accessing the media.

The exemplary library is controlled by a distributed control system receiving the logical commands from hosts, determining the required actions, and converting the actions to physical movements of the robot accessor 18, 28.

In the exemplary library, the distributed control system comprises a plurality of processor nodes, each having one or more processors. In one example of a distributed control system, a communication processor node 50 may be located in the base frame 11. The communication processor node provides a communication link for receiving the host commands, either directly or through the drives 15, via at least one external interface, e.g., coupled to line 80. The communication processor node 50 may additionally provide a communication link 70 for communicating with the data storage drives 15.

The communication processor node 50 may be located in the frame 11, close to the data storage drives 15. Additionally, in an example of a distributed processor system, one or more additional work processor nodes are provided, which may comprise, e.g., a work processor node 52 that may be located at the robot accessor 18, and that is coupled to the communication processor node 50 via a network 60. Each work processor node may respond to received commands that are broadcast to the work processor nodes from any communication processor node, and the work processor node may also direct the operation of the robot accessor, providing move commands. An XY processor node 55 may be provided and may be located at an XY system of the robot accessor 18. The XY processor node 55 is coupled to the network 60, and is responsive to the move commands, operating the XY system to position the gripper 20.

Also, an operator panel processor node 59 may be provided at the operator panel 23 for providing an interface for communicating between the operator panel and the communication processor node 50, the work processor node 52, and the XY processor node 55.

A network comprising a common bus 60 is provided, coupling the various processor nodes. The common bus may comprise a robust wiring network, such as the commercially available "CAN" bus system, which is a multi-drop network, having a standard access protocol and wiring standards, for example, as defined by CiA, the CAN in Automation Association, Am Weich selgarten 26, D-91058 Erlangen, Germany. Other similar bus networks, such as Ethernet, or a wireless network system, such as RF or infrared, may be employed in the library as is known to those of skill in the art. The processor nodes, e.g., nodes 50, 52, 55 and 59 of FIG. 3, may be coupled to the network 60 at a node interface 126a, b, c, d. Herein, the term "network" comprises any communication means between processor nodes which employs node addressing.

Referring to FIG. 2, the communication processor node 50 is coupled to each of the data storage drives 15 of the base frame 11, via lines 70, communicating with the drives and with host systems 40, 41 and 42. Alternatively, the host systems may be directly coupled to the communication processor node 50 at input 80, or to control port devices (not shown) which connect the library to the host system(s) with a library interface similar to the drive/library interface. As is known to those of skill in the art, various communication arrangements may be employed for communication with the hosts and with the data storage drives. In the example of FIG. 2, host connections 80 and 81 are SCSI busses. Bus 82 comprises an example of a Fibre Channel-Arbitrated Loop which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70.

An extension frame 12 may be provided, and may be coupled by an extension common bus 152, into the network 152, 60. Another communication processor node 155, similar to communication processor node 50 of FIG. 3, may be located in the extension frame and may communicate with hosts, e.g., at input 156, and data storage drives 15 in extension frame 12, e.g., via lines 170. The communication processor node 155 is coupled to the network 152, 60 at a node interface similar to node interface 126a of FIG. 3, the communication processor node 155 providing a communication link for the commands to the network 152, 60 so that the commands are linked to the base frame work processor node 52.

The communication processor node 155 may be mounted in the extension frame 12, closely adjacent to the coupled data storage drives 15 of the extension frame 12, communicating with the drives and with the attached host systems. The data storage drives 15 are also individually coupled to the communication processor node 155 by means of lines 170.

Additional extension frames with identical communication processor nodes 155, storage shelves 16, data storage drives 15, and extension busses 152, may be provided and each is coupled to the adjacent extension frame.

Further, the data storage library 10 may additionally comprise another robot accessor 28, for example, in a high availability frame 13. The robot accessor 28 may comprise a gripper 30 for accessing the data storage media, and an XY system 255 for moving the robot accessor. The high availability frame may be adjacent an extension frame 12, or adjacent the base frame 11, and the robot accessor 28 may run on the same horizontal mechanical path as robot accessor 18, or on an adjacent path. The exemplary control system additionally comprises an extension common bus 200 forming a network coupled to network 152 of an extension frame or to the network 60 of the base frame. Another communication processor node 250 may be provided, which is also similar to communication processor node 50, and may be located in the high availability frame 13, for receiving commands from hosts, either directly at input 256, or through control ports (not shown), or through the data storage drives 15 and lines 270, e.g., at input 256. The communication processor node 250 is coupled to the high availability frame network 200 and provides a communication link to the network, e.g., at a node interface similar to interface 126a of FIG. 3.

The communication processor node 250 may be mounted closely adjacent to the coupled data storage drives 15 of the high availability frame 13, communicating with the drives and with the attached host systems. The data storage drives 15 are also individually coupled to the communication processor node 250 by means of lines 270, and using an interface such as RS-422.

Referring to FIG. 2, a computer program implementing the present invention may be provided at one of the processor nodes, e.g., at work processor 52, or, optionally at processor 50, processor 155, or processor 250, or may be implemented in a plurality, or all, of the processor nodes.

Another example of a control system comprising a distributed nodal system of processors comprises an automobile multi-processor network.

Referring to FIG. 3, the processor nodes 50, 52, 55 and 59 comprise a processor 122a, b, c, d, which may comprise any microprocessor device known in the art. The processor 122a, b, c, d, operates under the control of program code, often called "firmware", since the code is related to the hardware constituting the library, as discussed above. The firmware is such that the processors operate the components of the system, e.g., shown as nodal hardware 132, 134, 136, 138. The firmware is typically maintained in a nonvolatile programmable memory 124a, b, c, d. The nonvolatile memory 124a, b, c, d may comprise any nonvolatile memory device known in the art, such as a flash memory, read only memory (ROM), electrically erasable programmable read only memory (EEPROM), battery backed-up RAM, hard disk drive etc. Alternatively, the nonvolatile memory 124a, b, c, d may be located in processor 122a, b, c, d, respectively.

The firmware program code image may be the same for all of the processor nodes, having both common code and specific code for each of the various functions, but which specific code is only used by the processor of the specific function. Alternatively, different code images may be provided for each of the processor nodes, specifically incorporating only code required by the processor of the specific function.

In order to communicate over the network, the processor nodes, have node addresses. As discussed above, node addresses, such as employed with CAN busses or Ethernet networks, as are known to those of skill in the art. In the example of a library, when a frame is added, the processor nodes added to the network may have no node address, and node addresses must be given to the new processor nodes. In addition, when an individual component, processor node, or a processor at the node, is replaced, either with a new component, etc., or another component, etc., is swapped, the processor node may have no node address, or, may employ its previous node address from another node position or another library. Incorrect node addressing may be detected by comparing saved library or frame unique information, as will be discussed hereinafter.

One way of providing a new node address is for an operator to assign a node address. In one example of a complex node address, a component may have a function portion of an address coded into a card, and a frame number is supplied to the processor node, and the function address and frame number are combined to calculate a node address. As an example, frames may be numbered consecutively, as "01", "02", etc., and each function could be given a different number. For example, a communication processor node designation of "C" in hex, and a frame number of "2", could have an address of "xC2". Alternatively, automatic modes of providing new node addresses may be employed. As one example, a cable is designed with certain lines tied high or low to provide a binary number that may be employed to calculate the node address. As another example, as discussed in U.S. patent application Ser. No. 09/854,865, filed May 14, 2001, a pulse generator and delay signal generator may provide an automatic frame count, to determine the number of the frame, such as "01", "02", as above. The automatic frame count may be used with the function address to calculate the node address. As another example, a server may employ a dynamic host configuration protocol (DHCP) to give a processor node an address.

As discussed above, failure is a possibility. As an example, the operator may misjudge the placement or function of the processor node. In the automatic mode, the binary cable might become defective, misplugged, or the wrong cable might be used. As another example, the frame counter circuit might become defective, or the cabling could become misplugged.

In such a case, the component may have no usable node address when on the network, may have a wrong address, or may present an address that is a duplicate of another component on the network. A duplicate address is possible when one processor node is at a component which performs a duplicate function as another component, and misreads the frame number, and employs the erroneous frame number in the address. Alternatively, the processor node may be swapped from one system to another, and be at a different location in the new system. Addressing errors, such as the presence of an unknown component, or a component with the wrong address, or duplicate on the network, can render all or part of the system inoperable, and require maintenance actions.

Figure 4:
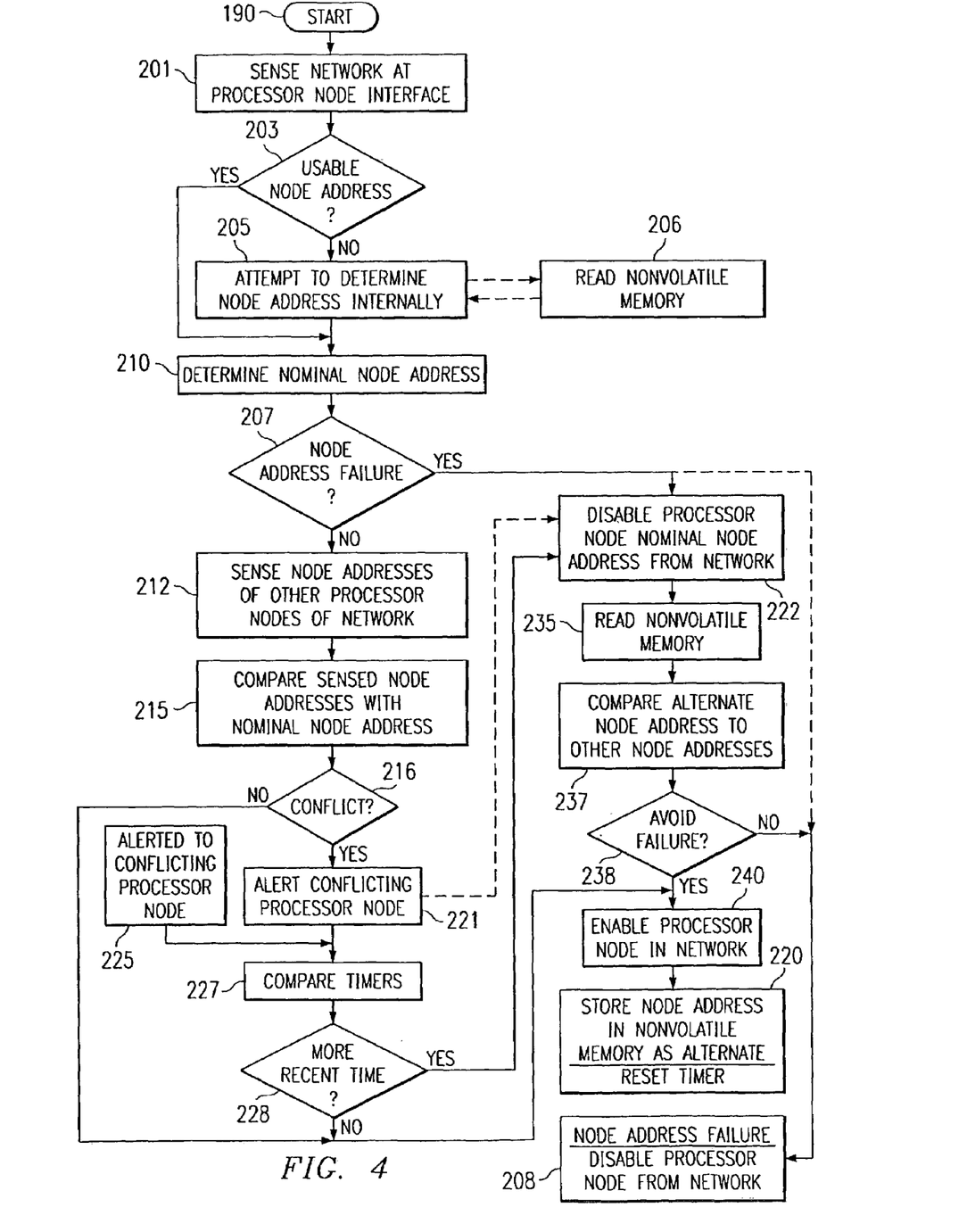
FIG. 4 is a flow chart depicting embodiments of the method of the present invention for handling addressing failure for the processor nodes of FIGS. 2 and 3.

Referring additionally to FIG. 4, in one embodiment, upon detection of a node address failure of a processor node for the network, such as lack of a node address, or presence of a duplicate address, for example, detected at the processor node interface, the processor node, or the system, (1) disables the processor node from the network, and/or (2) selects a node address that avoids the node address failure. The selected node address is for addressing the processor node in the network upon enabling the processor node in the network.

The process begins at step 190. In step 201, a processor node, such as processor node 50 of FIGS. 2 and 3, senses the network, e.g., network 60, at node interface 126*a*. As an example, the processor node may be powered up, be swapped into position, be in a frame that is added to the network, or have been reset, for example, because the processor 122*a* and/or another component of the node have been upgraded. As an example, the processor node contains a firmware or hardware power-on counter which starts the process of enabling the processor node. Once certain internal aspects are conducted, the processor node conducts step 201. As an alternative, as soon as the processor node comes up, a signal is provided on a non-disruptive basis, to a master node, for example, by means of a signal on a line, and the master node conducts step 201 for the processor node, e.g., processor node 50.

Included in step 201 is a check for a node address for the processor node, e.g., processor node 50. As discussed above, an address may be indicated by coding of a cable, by receipt of a manually generated or automatic indication, etc., and used directly or combined with internal information to determine a node address.

Step 203 comprises the determination whether any usable node address can be generated as the result of sensing the network. For example, an unusable address might be the result of a binary cable becoming defective and having a missing bit, presenting an incomplete address, or might have a crossed bit, presenting an erroneous or invalid address. Further, the cable may be misplugged, or the wrong cable might be used. As another example, the frame counter circuit might become defective, or the cabling could become misplugged. An unusable address may also therefore comprise no address signal.

Hence, an unusable address, as the term is employed herein, comprises an incomplete address, an erroneous or invalid address, or no address information. A potentially conflicting address may not be usable in a network, but is specifically discussed hereinafter. If no usable address can be generated, in step 205, the processor node 50 attempts to determine its node address internally. As one example, a function portion of the address is encoded in the card, and the remaining portion of an address encoded in a nonvolatile memory, for example, comprising a last successfully known address. In accordance with the present invention, in step 206, an alternate node address is read from its nonvolatile memory 124*a*, as is discussed in more detail hereinafter with respect to step 220. Alternatively, a predetermined node address may be provided.

In step 205, a determination is made whether a node address can be determined internally. If not, there is no nominal node address, and there is a node address failure, as indicated by step 207, and the processor node is disabled from the network in step 208.

By disabling a processor node having an address failure from the network, only the component is temporarily failed, and the system thus remains operational.

Alternatively, if steps 205 and 206 generate a node address, step 207 may be omitted, and any problem with the internally generated address may be caught later, e.g., at step 222 as will be discussed. Still further, steps 205, 206 and 207 may be omitted. In this case, a "NO" answer in step 203 would lead directly to step 208.

If a node address can be determined for the processor node, as indicated by either step 203 or step 205, that address is initially determined in step 210, and, herein, is termed a "nominal" node address. This is to differentiate the initially determined node address from a node address that will actually be used once a check is made for validity or any conflict, other types of addressing failure discussed hereinafter. Each of the process steps may be conducted by the processor node itself, or the system may conduct the process, for example, by a master node.

In step 207, optionally, a determination is made whether the nominal node address is likely to be valid or is likely to be wrong. For example, the nominal node address may be complete, and be in a frame or network location with an apparently correct number, but is in a different location within the frame and/or perform a different function, or is in a different library or network.

In accordance with an embodiment of the present invention, a test for a valid node address may comprise querying an associated element, or elements, such as nodal hardware, that has unique identifying information, such as a serial number that can be accessed by the node, and comparing it to a copy of the unique identifying information kept in the local nonvolatile memory of the node.

Herein, information identifying, defining, or designating hardware or other elements associated with a processor node, is termed "designating information" of associated elements, etc.

Thus, in the example of a library with data storage drives assigned to the frame of the node, the frame is known to contain a drive or drives, each with a given unique serial number for the "designating information" comparison.

As an example, referring to FIG. 2, the communication processor node 50 could query one or more data storage drives 15 over lines 70 and obtain one or more serial numbers, and compare it (them) to the serial number(s) stored in nonvolatile memory. If there is a complete match, the assumption can be made that the nominal node address is valid. More precisely, the node contains a correlation between a stored node address and stored designating information. Since a drive 15 can also be swapped, an inability to make a complete match may not indicate an invalid node address. Hence, all the component identifiers for components associated with a node may be stored in the node nonvolatile memory as designating information, and a voting scheme employed to determine whether a sufficient comparison is made to constitute a match.

Alternatively, the node itself may contain designating information, such as a "MAC" address, or a world-wide name (WWN), or a card serial number associated with the node card, that is readable through firmware.

If no match is made, step 207 determines that there is a node address failure, and the process proceeds to step 222 and the processor node nominal node address is disabled from the network at the processor node interface.

If the nominal node address appears valid, the node addresses of other processor nodes of the network, e.g., network 60, 152, 200 of FIG. 2, are sensed in step 212, for example, through alternate communication means, such as an RS-232 connection, or by network broadcasts. Specifically, a node may broadcast "I am 'C2', is anyone else", and will receive a response if there is a conflict. Then, in step 215, the sensed node addresses of other processor nodes are compared with the nominal node address. If, in step 216, no conflict is found, the nominal node address will be used as the node address for the processor node, and the process proceeds to step 240, as will be discussed.

If, instead, in step 216, the processor node or system determines the existence of any conflict between at least one of the sensed node addresses of other processor nodes with the nominal node address, the existing conflict may comprise a node address failure of the processor node for the network. The processor node, or nodes, having the conflicting node address may optionally be alerted in step 221, for example, by means of a network broadcast, etc.

As a further embodiment in accordance with the present invention, in the event of a conflict of node addresses, a further test may be conducted, as will be explained with respect to step 235; otherwise, if the further test is not implemented, a node address failure is indicated in optional step 222, and the processor node is disabled from the network.

In the further embodiment, at least two of the processor nodes of the network are subject to reset, and comprise at least one processor, at least one interface to the network, and a timer, the timer maintaining an indication of time since the processor node has been reset. The timer is illustrated only as a firmware timer of the processor, e.g., processors 122a, b, c, d, respectively, of processor nodes 50, 52, 55 and 59, but may alternatively comprise a hardware timer, as discussed above. The timers may comprise power-up counters, which are activated or reset at power-up of the processor node. Thus, the timers provide an indication of the time that a processor node has been active. The timers may comprise large value counters that are unlikely to wrap back to a value of zero, or may stop counting once a maximum value is reached, since the check is likely to be performed close to reset time of one of the processor nodes. The resolution of the timers is not very important, since they are only intended to identify a significant difference. Alternatively, the timers may not begin to count at power-on, but instead be reset upon determining that the processor node has a non-conflicting address, as will be explained. In such case, the time will be zero at a newly reset processor node until any conflict is resolved. Thus, a processor node having the more recent time is likely to have recently been reset, and to have the new conflicting nominal address, and a processor node not having the more recent time is likely to have been successfully operating at the address that is now conflicting. As above, a node address failure is determined upon the existence of any conflict between at least one of the sensed node addresses of other processor nodes with the nominal node address of a processor node. The processing node determining the node address failure, optionally, in step 221, may alert the other processor node having the conflicting sensed node address, of the conflict, for example, by means of a broadcast, etc., as discussed above.

Step 221 is optional in that a newly reset node is likely to have the more recent time and therefore is also likely to request information of a conflict. Another node having a conflicting address is likely to have been operating successfully, and may only supply the response that it has the requested address, and does not need to know that there is a conflict. The responding node, however, may also supply its timer value as part of the response. Hence, the requesting node will have both the response from which to determine the existence of an address conflict, and will have the timer value for a comparison. Alternatively, the response may first be supplied, and, only after a requesting node determines that there is a conflict, the node separately requests the timer value.

The processor node and the other processor node having the conflicting node addresses, as illustrated by step 225, or the system, in step 227, compare the times of the timers, to determine, in step 228, the processor node having the more recent time since a reset. A wide band of time may be considered a tie and not resolve the conflict, in that if two nodes are reset and come up with conflicting nominal addresses, a "race" condition may resolve the conflict incorrectly. Hence, an error situation may exist and require external inspection to resolve. Thus, herein, a "more recent time" includes a tie.

Alternatively, steps 221 and 225 may be omitted. Steps 227 and 228 may be performed in response to a broadcast of intent to assign an address. Further, steps 227 and 228 may be performed only by a node that has not yet assigned a node address, since this check is intended to cancel the later conflicting node from coming up. A node that has been operating successfully may not consider the possibility of a change of address.

If, in step 228, the processor node is determined to not have the more recent time, the nominal node address or the node address being used by the processor node, will be used as the node address for the processor node, and the process proceeds to step 240, as will be discussed.

The processor node having the more recent time as determined in step 228 may indicate a node address failure in step 222, causing the processor node to be disabled from the network.

In another embodiment of the present invention, the processor node, e.g., processor node 50 of FIG. 3, additionally comprises a nonvolatile memory 124a, and maintains an alternate node address of the processor node in the nonvolatile memory. As an example, the alternate node address may comprise the node address of the last successful detection of node addressing, as will be discussed with respect to step 220. Alternatively, the system maintains a nonvolatile memory at a known location, for example, at a master node, such as nonvolatile memory 124c of a master node 55.

Step 222 may be a temporary disabling of the processor node while the remaining steps are conducted, or, alternatively, step 222 may be omitted, and the remaining steps conducted first, and any node address failure conducted at step 208, as will be discussed.

Thus, upon detecting a node address failure, for example, in step 228, or directly as a result of a conflict, for example, in step 216, the alternate node address in a nonvolatile memory is read in step 235. The alternate node address comprises an address that is likely to avoid a conflict, such as is determined in step 220. The nonvolatile memory of step 235 may be the same or different than the nonvolatile memory of step 206, and the alternate node address may be different than the node address of step 206. If an alternate node address is provided, the node may be selected by use of other node identifying information as discussed above.

In step 220, the alternate node address of step 235, or the alternate address that becomes the nominal node address of step 206, if validated in step 240, discussed hereinafter, comprises the node address of the last successful detection of node addressing. For example, when a processor node goes through the process of reset and is found to have a node address that avoids conflict with any processor node of the network, that node address is, at least at that point, known to be a good node address. Therefore, in step 220, the known good node address is stored in the nonvolatile memory of the processor node.

If the processor node is swapped, etc., the once good node address may conflict in the new environment. Hence, in step 237, the sensed node addresses of the other processor nodes of step 212 are compared to the alternate node address of the nonvolatile memory. Alternatively, steps 212 and 215 may be repeated, or similar steps taken. If, in step 238, the alternate node address avoids conflict with the sensed node addresses of the other processor nodes of step 215, and/or passes a designating information match test of step 207, the alternate node address avoids a node address failure, and the alternate node address of the nonvolatile memory is selected as the node address of the processor node, and the process proceeds to step 240.

If, however, a conflict still, or again, exists, the processor node presents an address failure for the network, and, in step 208, is disabled from the network.

By disabling a processor node having an address failure from the network, only the component is temporarily failed, and the system remains operational. Employing an alternate node address which avoids the address failure, further prevents any disruption to the system, and avoids an immediate repair action for the processor node or component.

In step 240, the processor node is enabled in the network with the apparently valid and non-conflicting address. In step 220, that node address is stored in the non-volatile memory as an alternate node address, and the timer may be reset.

It is possible that the resultant nominal node address or alternative node address, although apparently valid, and non-conflicting, is still incorrect. Hence, the storing operation of step 220 may additionally occur after a further verification, for example, a configuration, etc. Thus there is an added assurance that the address stored in non-volatile memory as backup is a known "good" node address.

In step 220, in addition to storing the now "good" node address in the nonvolatile memory as an alternate node address, the timer may be reset at this time, as discussed above, if the timer is not a power-up timer.

As an alternative, step 240 may be conducted after step 220, such that the processor node is enabled in the network with the non-conflicting node address and step 240 does not comprise additional verification.

Those of skill in the art will understand that the above steps may be modified and/or changed in sequence from those shown in FIG. 4. Those of skill in the art will also understand that other, equivalent elements may be substituted for those illustrated in FIGS. 1–3, and that the invention may be implemented in accordance with FIG. 3, in alternative environments than that of the library of FIGS. 1 and 2, one example comprising processing nodes of an automobile multi-processor network.

While the preferred embodiments of the present invention have been illustrated in detail, it should be apparent that modifications and adaptations to those embodiments may occur to one skilled in the art without departing from the scope of the present invention as set forth in the following claims.

We claim:

1. An automated data storage library, comprising:
   a plurality of storage shelves for storing data storage media;
   at least one data storage drive for reading and/or writing data with respect to said data storage media;
   at least one robot accessor for transporting said data storage media between said plurality of storage shelves and said at least one data storage drive;
   a network; and
   a plurality of processor nodes for operating said automated data storage library, said plurality of processor nodes comprising nodes of said network, each of said plurality of processor nodes comprising at least one processor and at least one interface to said network;
   at least one of said plurality of processor nodes:
   upon detection of a node address failure of said processor node for said network, disables said processor node from said network at said at least one interface.

2. The automated data storage library of claim 1, wherein said at least one processor node:
   additionally comprises a nonvolatile memory;
   maintains an alternate node address of said processor node in said nonvolatile memory;
   detects said node address failure, by attempting to determine its own node address; and
   upon failing to determine any usable node address as its own, selects said alternate node address in said nonvolatile memory.

3. The automated data storage library of claim 1, wherein said at least one processor node detects said node address failure, by sensing said network at said processor node interface.

4. An automated data storage library, comprising:
   a plurality of storage shelves for storing data storage media;
   at least one data storage drive for reading and/or writing data with respect to said data storage media;
   at least one robot accessor for transporting said data storage media between said plurality of storage shelves and said at least one data storage drive;
   a network; and
   a plurality of processor nodes for operating said automated data storage library, said plurality of processor nodes comprising nodes of said network, each of said plurality of processor nodes comprising at least one processor and at least one interface to said network;
   at least one of said plurality of processor nodes:
   determines a nominal node address as its own;
   senses node addresses of other processor nodes of said network;
   compares said sensed node addresses of other processor nodes with said nominal node address;
   determines existence of any conflict between at least one of said sensed node addresses of other processor nodes with said nominal node address, said existing conflict comprising a node address failure of said processor node for said network; and upon detection of said node address failure of said processor node for said network, disables said processor node nominal node address from said network at said at least one interface.

5. The automated data storage library of claim 4, wherein said at least one processor node:
   upon detection of said node address failure of said processor node for said network, additionally selects a node address that avoids said node address failure, said selected node address for addressing said processor node in said network at said at least one interface upon enabling said processor node in said network.

6. The automated data storage library of claim 5, wherein said at least one processor node:
   additionally comprises a nonvolatile memory;
   maintains an alternate node address of said processor node in said nonvolatile memory;
   upon said determination of a conflict and detection of said node address failure of said processor node for said network, further compares said alternate node address of said nonvolatile memory with said sensed node addresses of said other processor nodes; and
   if said alternate node address avoids conflict with said sensed node addresses of said other processor nodes, selects said node address that avoids said node address failure, by selecting said alternate node address of said nonvolatile memory.

7. An automated data storage library, comprising:
   a plurality of storage shelves for storing data storage media;
   at least one data storage drive for reading and/or writing data with respect to said data storage media;
   at least one robot accessor for transporting said data storage media between said plurality of storage shelves and said at least one data storage drive;
   a network; and
   a plurality of processor nodes for operating said automated data storage library, said plurality of processor nodes comprising nodes of said network, at least two of said plurality of processor nodes subject to reset, and comprising at least one processor, at least one interface to said network, and a timer, said timer maintaining an indication of time since said processor node has been reset;
   (I) at least one of said plurality of processor nodes:
      determines a nominal node address as its own;
      senses node addresses of other processor nodes of said network;
      compares said sensed node addresses of other processor nodes with said nominal node address;
      determines existence of any conflict between at least one of said sensed node addresses of other processor nodes with said nominal node address, said existing conflict comprising a node address failure in said network; and
   (II) said processor node having said conflicting sensed node address:
      compares the time of said timer of said processor node to the time of said timer of said other processor node having said conflicting said sensed node address, to determine the processor node having the more recent time of said timers; and
   if said processor node has said more recent time, disables said processor node nominal node address from said network at said at least one interface.

8. The automated data storage library of claim 7, wherein said processor node having said more recent time: additionally selects a node address that avoids said node address failure, said selected node address for addressing said processor node having said more recent time, in said network, upon enabling said processor node in said network.

9. The automated data storage library of claim 8, wherein said processor node having said more recent time:
   additionally comprises a nonvolatile memory;
   maintains an alternate node address of said processor node in said nonvolatile memory;
   further compares said alternate node address of said nonvolatile memory with said sensed node addresses of said other processor nodes; and
   if said alternate node address avoids conflict with said sensed node addresses of said other processor nodes, selects said node address that avoids said node address failure, by selecting said alternate node address of said nonvolatile memory.

10. A method for handling addressing failure of a network of an automated data storage library, said automated data storage library for accessing data storage media, said automated data storage library comprising a plurality of storage shelves for storing data storage media; at least one data storage drive for reading and/or writing data with respect to said data storage media; at least one robot accessor for transporting said data storage media between said plurality of storage shelves and said at least one data storage drive; a network; and a plurality of processor nodes for operating said automated data storage library, said plurality of processor nodes comprising nodes of said network, each of said plurality of processor nodes comprising at least one processor and at least one interface to said network; said method comprising the steps of:
   detecting a node address failure of one of said plurality of processor nodes for said network; and
   upon detecting said node address failure, disabling said processor node having said node address failure from said network at said at least one interface.

11. The method of claim 10, wherein said at least one processor node additionally comprises a nonvolatile memory; said method additionally comprising the steps of:
   maintaining an alternate node address of said processor node in said nonvolatile memory;
   detecting said node address failure, by attempting to determine a node address for said processor node; and
   upon failing to determine any usable node address for said processor node, selecting said alternate node address in said nonvolatile memory for said processor node having said node address failure.

12. The method of claim 10, wherein said step of detecting said node address failure, comprises said at least one processor node sensing said network at said processor node interface.

13. A method for handling addressing failure of a network of an automated data storage library, said automated data storage library for accessing data storage media, said automated data storage library comprising a plurality of storage shelves for storing data storage media; at least one data storage drive for reading and/or writing data with respect to said data storage media; at least one robot accessor for transporting said data storage media between said plurality of storage shelves and said at least one data storage drive; a network; and a plurality of processor nodes for operating said automated data storage library, said plurality of processor nodes comprising nodes of said network, each of said plurality of processor nodes comprising at least one processor and at least one interface to said network; said method comprising the steps of:

determining a nominal node address of at least one of said plurality of processor nodes;

sensing node addresses of other processor nodes of said network;

comparing said sensed node addresses of other processor nodes with said nominal node address;

determining existence of any conflict between at least one of said sensed node addresses of other processor nodes with said nominal node address, said existing conflict comprising a node address failure of said processor node for said network; and upon detection of said node address failure of said processor node for said network, disabling said processor node nominal node address having said node address failure from said network at said at least one interface.

14. The method of claim 13, additionally comprising the step of:

upon detection of said node address failure of said processor node for said network, selecting a node address that avoids said node address failure, said selected node address for addressing said processor node having said node address failure, in said network, upon enabling said processor node in said network.

15. The method of claim 14, wherein said at least one processor node additionally comprises a nonvolatile memory; said method additionally comprising the steps of:

maintaining an alternate node address of said at least one processor node in said nonvolatile memory;

upon said determination of a conflict and detection of said node address failure of said at least one processor node for said network, further comparing said alternate node address of said nonvolatile memory with said sensed node addresses of said other processor nodes; and if said alternate node address avoids conflict with said sensed node addresses of said other processor nodes, selecting said node address that avoids said node address failure, by selecting said alternate node address of said nonvolatile memory.

16. A method for handling addressing failure of a network of an automated data storage library, said automated data storage library for accessing data storage media, said automated data storage library comprising a plurality of storage shelves for storing data storage media; at least one data storage drive for reading and/or writing data with respect to said data storage media; at least one robot accessor for transporting said data storage media between said plurality of storage shelves and said at least one data storage drive; a network; and a plurality of processor nodes for operating said automated data storage library, said plurality of processor nodes comprising nodes of said network, at least two of said plurality of processor nodes subject to reset, and comprising at least one processor, at least one interface to said network, and a timer, said timer maintaining an indication of time since said processor node has been reset; said method comprising the steps of:

determining a nominal node address of at least one of said plurality of processor nodes;

sensing node addresses of other processor nodes of said network;

comparing said sensed node addresses of other processor nodes with said nominal node address of said at least one processor node;

determining existence of any conflict between at least one of said sensed node addresses of other processor nodes with said nominal node address of said at least one processor node, said existing conflict comprising a node address failure in said network;

comparing the time of said timer of said processor node having said nominal node address to the time of said timer of said other processor node having said conflicting said sensed node address, to determine the processor node having the more recent time of said timers; and if said processor node having said nominal node address has said more recent time, disabling said processor node nominal node address from said network at said at least one interface.

17. The method of claim 16, additionally comprising the step of:

selecting a node address for said processor node having said more recent time, that avoids said node address failure, said selected node address for addressing said processor node having said more recent time, in said network, upon enabling said processor node in said network.

18. The method of claim 17, wherein said automated data storage library additionally comprises a nonvolatile memory; and wherein said method additionally comprising the steps of:

maintaining an alternate node address in said nonvolatile memory;

further comparing said alternate node address of said nonvolatile memory for said processor node having said more recent time with said sensed node addresses of said other processor nodes; and if said alternate node address avoids conflict with said sensed node addresses of said other processor nodes, selecting said node address that avoids said node address failure, by selecting said alternate node address of said nonvolatile memory.

19. An automated data storage library, comprising:

a plurality of storage shelves for storing data storage media;

at least one data storage drive for reading and/or writing data with respect to said data storage media;

at least one robot accessor for transporting said data storage media between said plurality of storage shelves and said at least one data storage drive;

a network; and a plurality of processor nodes for operating said automated data storage library, said plurality of processor nodes comprising nodes of said network, each of said plurality of processor nodes comprising at least one processor and at least one interface to said network;

at least one of said plurality of processor nodes associated with at least one element of said library, said processor node:

maintains designating information of said at least one element associated with said processor node;

determines a nominal node address as its own for said network;

senses present designating information of at least one element associated with said processor node;

compares said present designating information to said maintained designating information;

determines whether a match is made between said compared said present designating information and said maintained designating information, a failure of said match comprising a node address failure of said processor node for said network; and upon said node address failure of said processor node for said network, disables said processor node nominal node address from said network at said at least one interface.

* * * * *